United States Patent
Chen et al.

(10) Patent No.: US 11,525,976 B2
(45) Date of Patent: Dec. 13, 2022

(54) FOCUSING MECHANISM AND PROJECTION DEVICE

(71) Applicant: Coretronic Corporation, Hsin-Chu (TW)

(72) Inventors: Chi-Chen Chen, Hsin-Chu (TW); Chang-Ching Li, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 151 days.

(21) Appl. No.: 17/209,235

(22) Filed: Mar. 23, 2021

(65) Prior Publication Data

US 2021/0318514 A1 Oct. 14, 2021

(30) Foreign Application Priority Data

Apr. 10, 2020 (CN) .......................... 202010279727.3

(51) Int. Cl.
*G02B 7/04* (2021.01)
*G02B 13/16* (2006.01)

(52) U.S. Cl.
CPC ............... *G02B 7/04* (2013.01); *G02B 13/16* (2013.01)

(58) Field of Classification Search
CPC .... H04N 9/315; H04N 9/3141; H04N 9/3152; H04N 9/3161; H04N 9/3164; G02B 13/02; G02B 13/12; G02B 13/16; G02B 13/26; G02B 7/04; G02B 7/09; G02B 7/105; G03B 21/008; G03B 21/28; G03B 21/142; G03B 21/145; G03B 21/2013; G03B 21/2033; G03B 21/2053
See application file for complete search history.

(56) References Cited

U.S. PATENT DOCUMENTS

2019/0064641 A1* 2/2019 Fukuyama ........... G03B 21/145
2019/0384146 A1* 12/2019 Dong .................... G02B 7/028

FOREIGN PATENT DOCUMENTS

CN 103365059 10/2013
TW 200615678 5/2006

* cited by examiner

*Primary Examiner* — Sultan Chowdhury
(74) *Attorney, Agent, or Firm* — JCIPRNET

(57) ABSTRACT

A focusing mechanism, including a positioning seat, a focus ring, a lens, and a knob is provided. The lens has an optical axis. The positioning seat has a first surface, a second surface opposite to the first surface, and a sliding groove penetrating the first surface and the second surface. The focus ring is slidably and rotatably disposed on the second surface of the positioning seat. The lens is fixed to the focus ring. The focus ring has a positioning hole and is located between the positioning seat and the lens. The positioning hole is aligned to the sliding groove in a direction perpendicular to the optical axis. The knob passes through the sliding groove and is inserted into the positioning hole. The knob is pressed against the first surface of the positioning seat. A projection device is also provided.

18 Claims, 10 Drawing Sheets

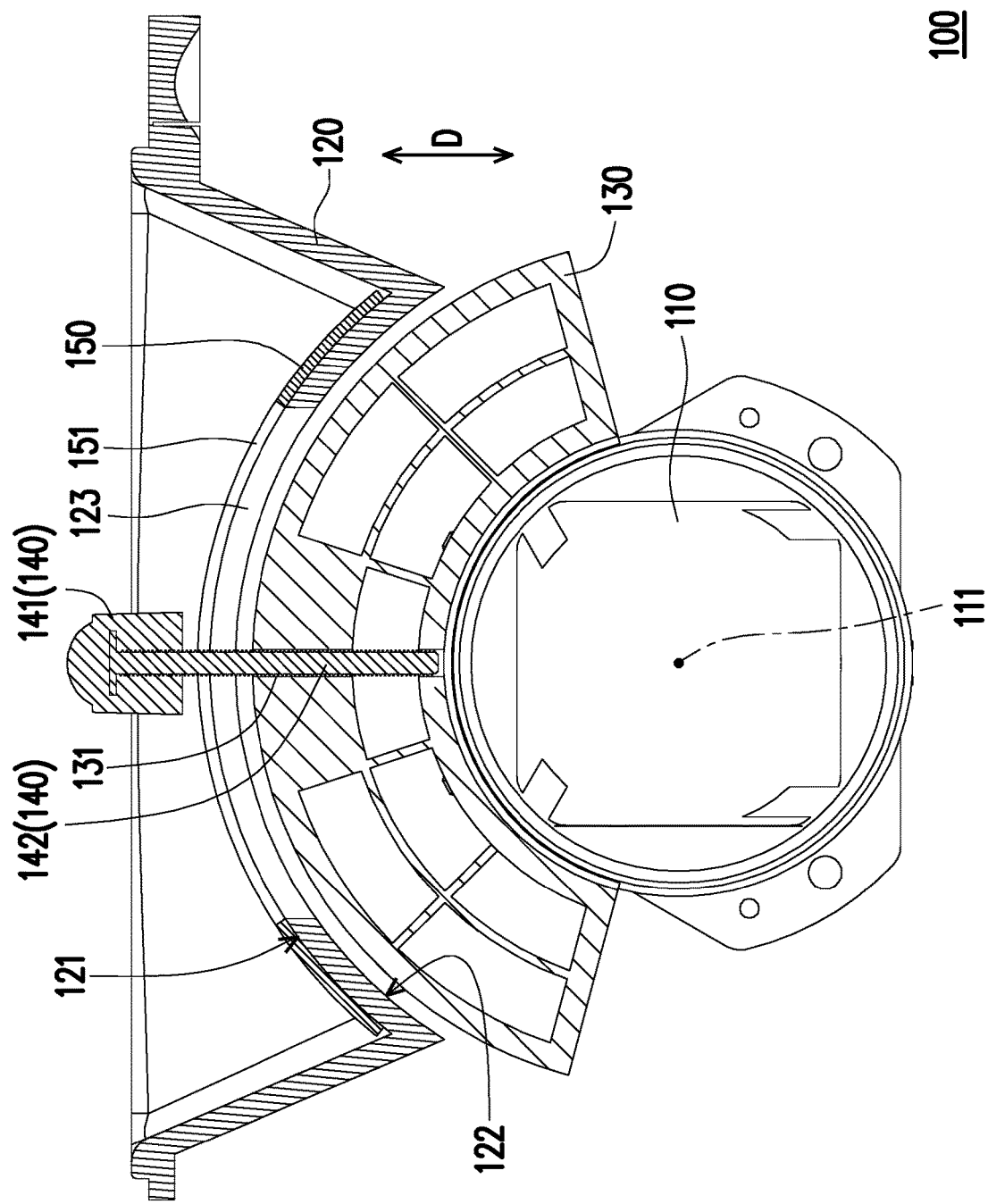

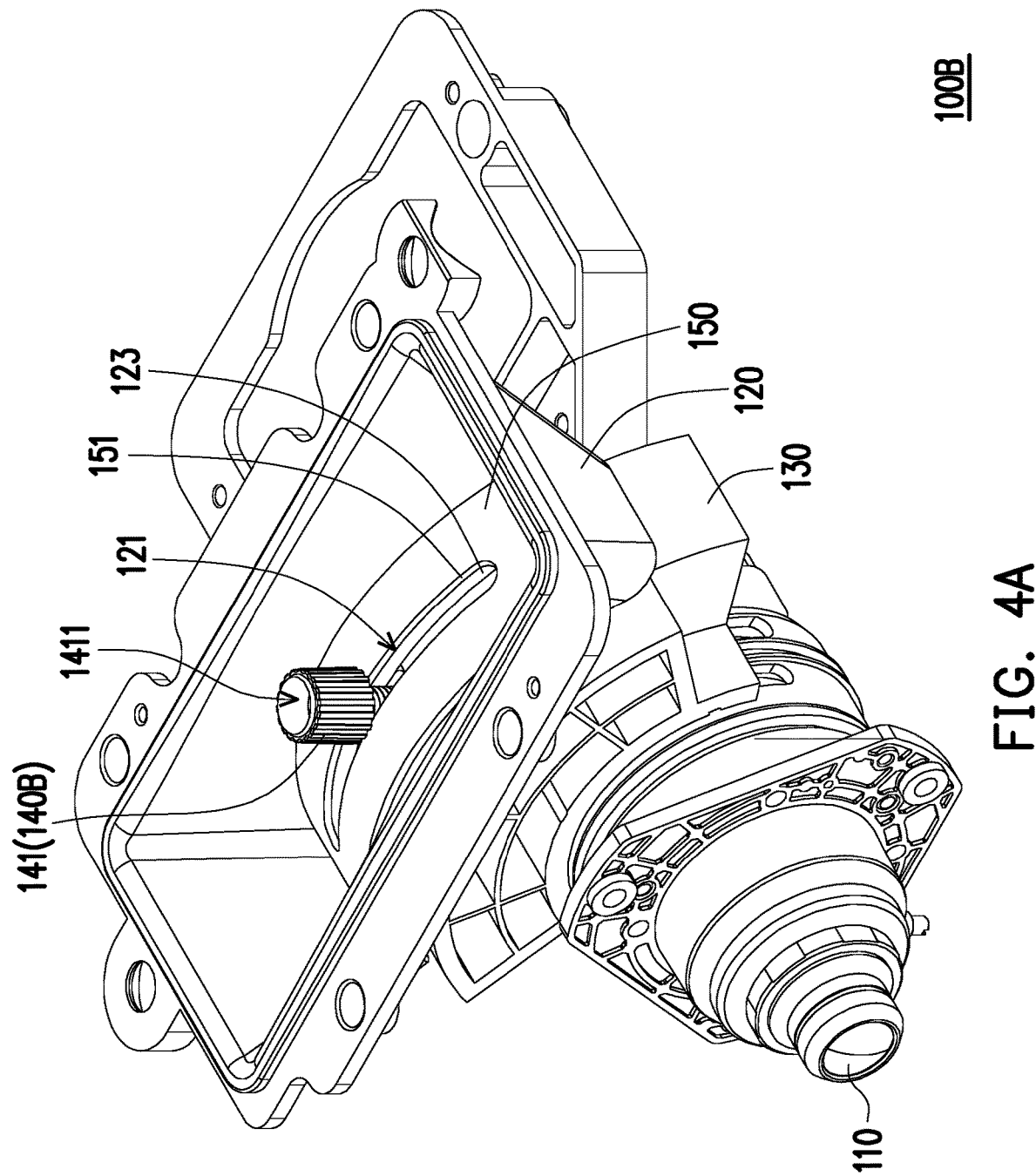

FOCUSING MECHANISM AND PROJECTION DEVICE

CROSS-REFERENCE TO RELATED APPLICATION

This application claims the priority benefit of China application serial no. 202010279727.3, filed on Apr. 10, 2020. The entirety of the above-mentioned patent application is hereby incorporated by reference herein and made a part of this specification.

BACKGROUND

Technical Field

The disclosure relates to a projection device, and in particular to a focusing mechanism and a projection device.

Description of Related Art

Most projection devices are placed on the desktop, hung on the ceiling, or hung on the wall. In order to improve the sharpness of the projection image thereof, the projection device is equipped with a focusing mechanism for the user to adjust the focal length according to actual operation conditions. After adjusting the focal length, if the projection device is shaken by an external force, the focusing mechanism is likely to loosen and shift, causing the originally set focal length to change, such that the projection image becomes out of focus.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides a focusing mechanism and a projection device, which help in preventing an out-of-focus situation from happening.

Other objectives and advantages of the invention may be further understood from the technical features disclosed in the disclosure.

In order to achieve one, part, or all of the above objectives or other objectives, the disclosure provides a focusing mechanism, including a positioning seat, a focus ring, a lens, and a knob. The lens has an optical axis. The positioning seat has a first surface, a second surface opposite to the first surface, and a sliding groove penetrating the first surface and the second surface. The focus ring is slidably and rotatably disposed on the second surface of the positioning sea and the lens is fixed to the focus ring. The focus ring has a positioning hole, wherein the focus ring is located between the positioning seat and the lens, and the positioning hole is aligned to the sliding groove in a direction perpendicular to the optical axis. The knob passes through the sliding groove and is inserted into the positioning hole. The knob is pressed against the first surface of the positioning seat.

In order to achieve one, part, or all of the above objectives or other objectives, the disclosure provides a projection device, including a light source, a light valve, and a projection lens. The light source is configured to provide an illumination beam. The light valve is disposed on a transmission path of the illumination beam and is configured to convert the illumination beam into an image beam. The projection lens is disposed on a transmission path of the image beam and the projection lens includes an optical module and a focusing mechanism. The focusing mechanism is disposed on one side of the optical module and the optical module is located between the light valve and the focusing mechanism. The focusing mechanism includes a positioning seat, a focus ring, a lens, and a knob. The lens has an optical axis, wherein the lens is located on the transmission path of the image beam and is configured to project the image beam. The positioning seat has a first surface, a second surface opposite to the first surface, and a sliding groove penetrating the first surface and the second surface. The focus ring is slidably and rotatably disposed on the second surface of the positioning seat and the lens is fixed to the focus ring. The focus ring has a positioning hole, wherein the focus ring is located between the positioning seat and the lens, and the positioning hole is aligned to the sliding groove in a direction perpendicular to the optical axis. The knob passes through the sliding groove and is inserted into the positioning hole. The knob is pressed against the first surface of the positioning seat.

Based on the above, the embodiments of the disclosure have at least one of the following advantages or effects. In the focusing mechanism and the projection device of the disclosure, the user may drive the focus ring and the lens fixed to the focus ring through the knob, so as to adjust the focal length or the sharpness of the projection image. After adjusting the focal length or the sharpness of the projection image, the user may lock the focus ring to the positioning seat through the knob to prevent the focus ring and the lens fixed to the focus ring from being shaken by an external force, thereby preventing an out-of-focus situation from happening.

Other objectives, features and advantages of the disclosure will be further understood from the further technological features disclosed by the embodiments of the disclosure wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 2B is a cross-sectional view of the focusing mechanism of FIG. 2A before locking.

FIG. 4A is a schematic view of a specific structure of a focusing mechanism according to still another embodiment of the disclosure.

DETAILED DESCRIPTION OF DISCLOSED EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the disclosure can be positioned in a number of different orientations. As such, the directional terminology is used for purposes of illustration and is in no way limiting. On the other hand, the drawings are only schematic and the sizes of components may be exaggerated for sharpness. It is to be understood that other embodiments may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
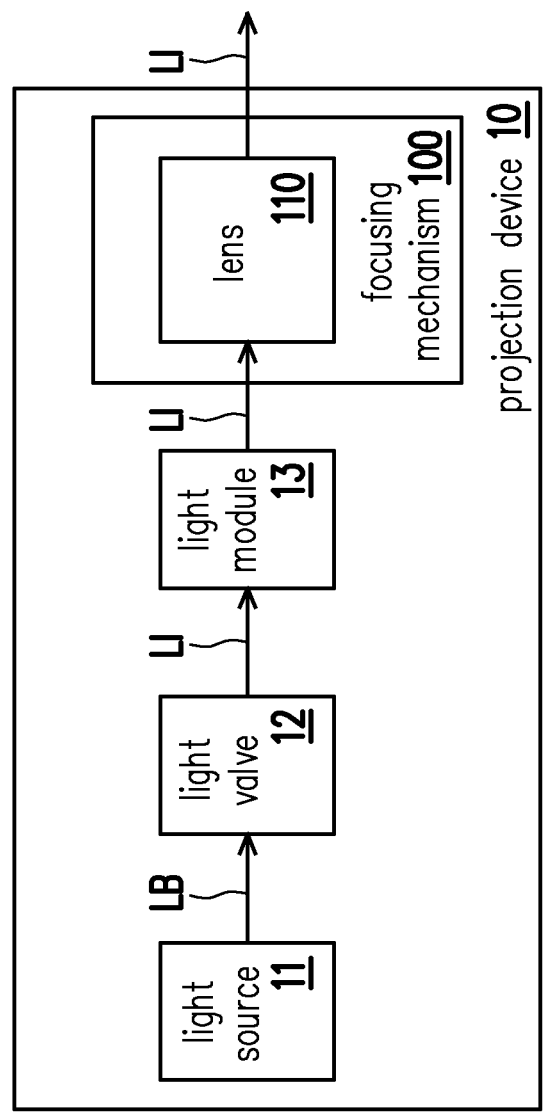
FIG. 1 is a schematic view of a projection device according to an embodiment of the disclosure.
Figure 2A:
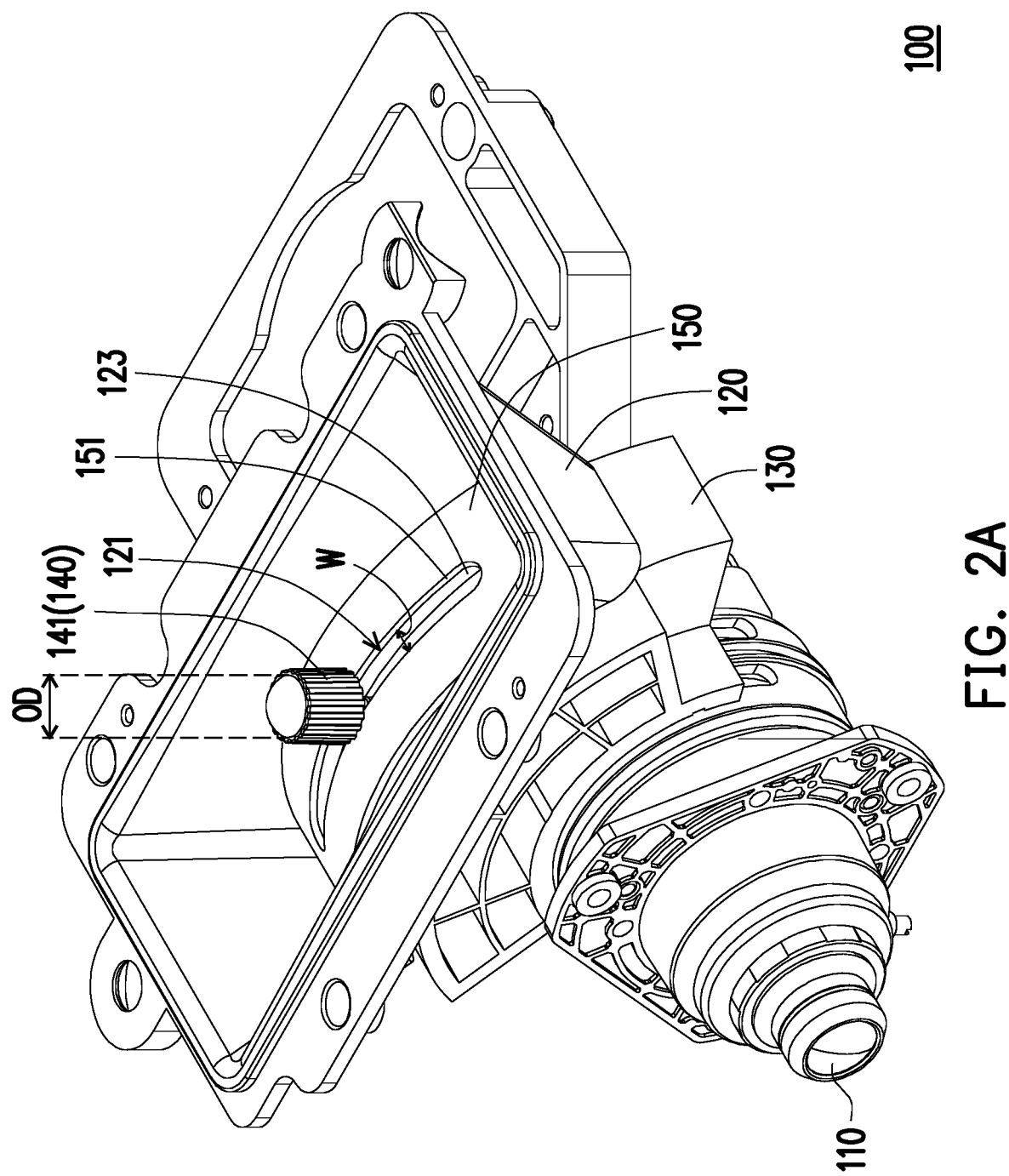
FIG. 2A is a schematic view of a specific structure of a focusing mechanism according to an embodiment of the disclosure.

FIG. 1 is a schematic view of a projection device according to an embodiment of the disclosure. FIG. 2A is a schematic view of a specific structure of a focusing mechanism according to an embodiment of the disclosure. Please refer to FIG. 1 and FIG. 2A. In the embodiment, a projection device 10 includes a light source 11, a light valve 12, and a projection lens (not shown), wherein the projection lens is composed of an optical module 13 and a focusing mechanism 100. In detail, the light source 11 is configured to provide an illumination beam LB. The light valve 12 is disposed on a transmission path of the illumination beam LB and is configured to convert the illumination beam LB into an image beam LI. The optical module 13 is disposed on a transmission path of the image beam LI, wherein the focusing mechanism 100 is disposed on one side of the optical module 13 and the optical module 13 is located between the light valve 12 and the focusing mechanism 100.

For example, the light source 11 is composed of a plurality of light-emitting elements, a wavelength conversion element, a light homogenization element, a filter element, and a plurality of light splitting/combining elements, and is configured to provide light of different wavelengths as an image light source. However, the disclosure does not limit the type or form of the light source 11 in the projection device 10. Sufficient teaching, suggestion, and implementation explanation for the detailed structure and implementation manner of the light source 11 may be obtained from common knowledge in the art, so there will be no reiteration here.

The light valve 12 is, for example, a reflective light modulator such as a liquid crystal on silicon panel (LCoS panel), a digital micro-mirror device (DMD), etc. In some embodiments, the light valve 12 may also be a transmissive light modulator such as a transparent liquid crystal panel, an electro-optical modulator, a magneto-optic modulator, an acousto-optic modulator (AOM), etc. The disclosure does not limit the form and type of the light valve 12. Sufficient teaching, suggestion, and implementation explanation for the detailed steps and implementation manner of the method of the light valve 12 converting the illumination beam LB into the image light beam LI may be obtained from common knowledge in the art, so there will be no reiteration here. In the embodiment, the number of the light valve 12 is one. For example, the projection device 10 uses a single DMD, but in other embodiments, there may be multiple and the disclosure is not limited thereto.

The projection lens is disposed on the transmission path of the image beam LI and is configured to project the image beam LI out of the projection device 10 onto a projection target (not shown), such as a screen or a wall surface. In detail, the optical module 13 includes a light guiding element, such as a light combining prism. The image beam LI is transmitted from the optical module 13 to the focusing mechanism 100, wherein the focusing mechanism 100 includes a lens 110 and the lens 110 is disposed on the transmission path of the image beam LI. The lens 110 is configured to project the image beam LI out of the projection device 10 onto a projection target (not shown), such as a screen or a wall surface.

Figure 2C:
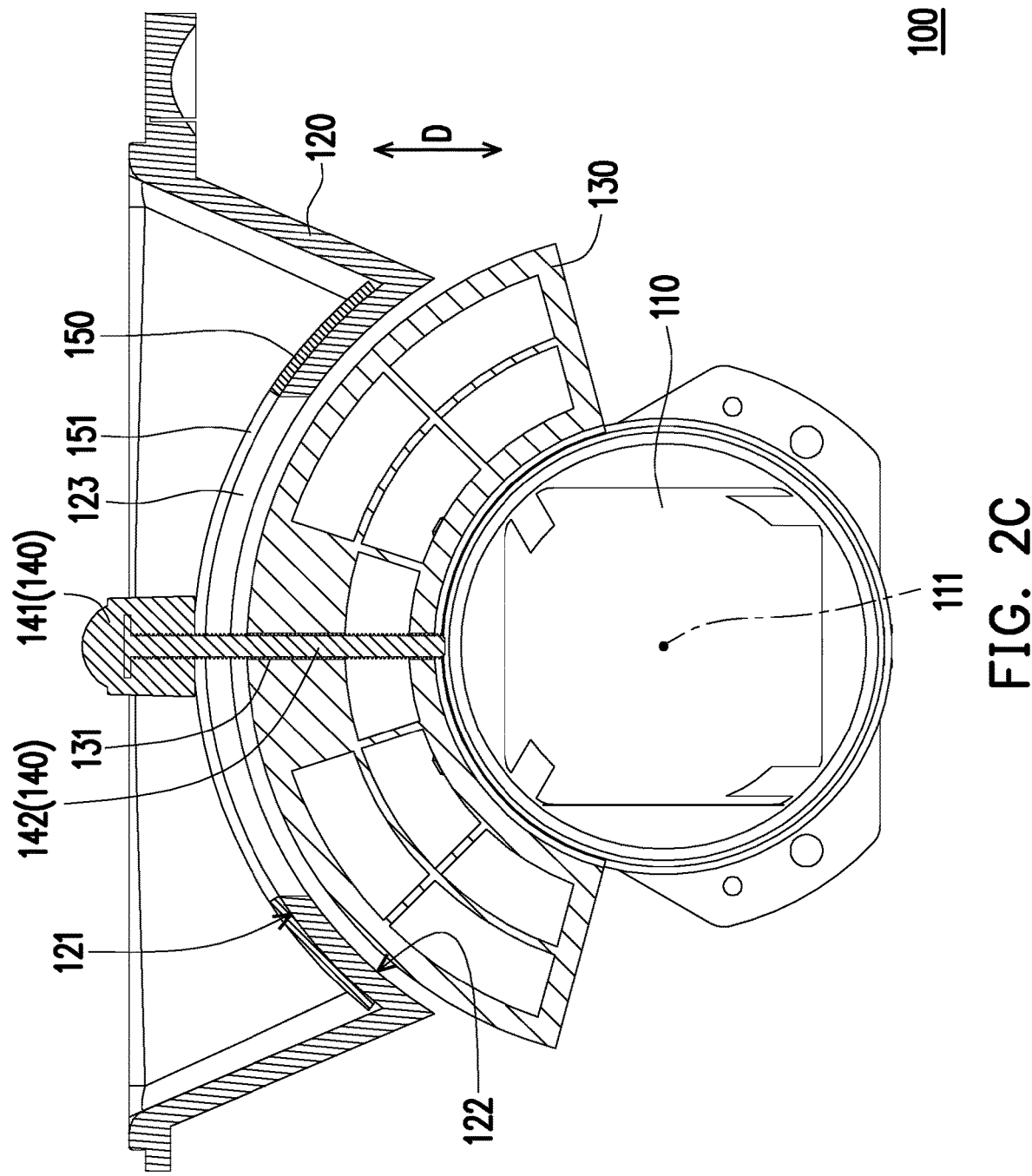
FIG. 2C is a cross-sectional view of the focusing mechanism of FIG. 2B after locking.

FIG. 2B is a cross-sectional view of the focusing mechanism of FIG. 2A before locking. FIG. 2C is a cross-sectional view of the focusing mechanism of FIG. 2B after locking. Please refer to FIG. 2A to FIG. 2C. In the embodiment, the focusing mechanism 100 includes the lens 110, a positioning seat 120, a focus ring 130, and a knob 140. The lens 110 is fixed to the focus ring 130 and the focus ring 130 may slide and rotate relative to the positioning seat 120, so the lens 110 moves synchronously with the positioning seat 120. The lens 110 has an optical axis 111 and a rotational reference axis of the focus ring 130 is coaxial with the optical axis 111. On the other hand, the knob 140 may slide relative to the positioning seat 120 and is coupled to the focus ring 130. Therefore, the user may apply a force to the knob 140, such that the knob 140 slides relative to the positioning seat 120. At the same time, the focus ring 130 and the lens 110 are driven by the knob 140 to slide and rotate relative to the positioning seat 120, so as to adjust the focal length or the sharpness of the projection image. After adjusting the focal length or the sharpness of the projection image, the user may lock the focus ring 130 to the positioning seat 120 through the knob 140 to prevent the focus ring 130 and the lens 110 from being shaken by an external force, thereby preventing an out-of-focus situation from happening.

In detail, the positioning seat 120 has a first surface 121, a second surface 122 opposite to the first surface 121, and a sliding groove 123 penetrating the first surface 121 and the second surface 122, wherein the first surface 121 may be a convex surface and the second surface 122 may be a concave surface. The focus ring 130 is slidably and rotatably disposed on the second surface 122 of the positioning seat 120 and the lens 110 moves synchronously with the focus ring 130. On the other hand, the focus ring 130 has a positioning hole 131, wherein the focus ring 130 is located between the positioning seat 120 and the lens 110, and the positioning hole 131 is aligned to the sliding groove 123 in a direction D perpendicular to the optical axis 111.

The knob 140 passes through the sliding groove 123 from the first surface 121 and the knob 140 further passes through the second surface 122 and is inserted into the positioning hole 131. In the state shown in FIG. 2B, the knob 140 is not pressed against the first surface 121 of the positioning seat 120. At this time, the user may apply a force to the knob 140, such that the knob 140 slides relative to the positioning seat 120, that is, swings with the optical axis as the rotational reference axis. At the same time, the focus ring 130 and the lens 110 are driven by the knob 140 to slide and rotate relative to the positioning seat 120, so as to adjust the focal length or the sharpness of the projection image.

Please refer to FIG. 2A to FIG. 2C. In the embodiment, the focusing mechanism 100 further includes a positioning diaphragm 150, wherein the positioning diaphragm 150 may be made of rubber or silicone and covers the first surface 121 of the positioning seat 120. Since the sliding groove 123 is exposed outside the positioning diaphragm 150, the positioning diaphragm 150 does not block the path of a first column 142 passing through the sliding groove 123.

In an embodiment, after adjusting the focal length or the sharpness of the projection image, the user may apply a force to turn the knob 140, such that the knob 140 is pressed against the first surface 121 of the positioning seat 120. In the embodiment, after adjusting the focal length or the sharpness of the projection image, the user may apply a force to turn the knob 140, such that the knob 140 is pressed against the positioning diaphragm 150 on the first surface 121 covering the positioning seat 120, which may increase the frictional force, as shown in FIG. 2C.

In the state shown in FIG. 2C, based on the frictional resistance between the knob 140 and the positioning diaphragm 150 (or the first surface 121 of the positioning seat 120), the knob 140 cannot be arbitrarily toggled, so as to lock the focus ring 130 to the positioning seat 120 through the knob 140 to prevent the focus ring 130 and the lens 110 from being shaken by an external force, thereby preventing an out-of-focus situation from happening.

In detail, please refer to FIG. 2A to FIG. 2C. In the embodiment, the knob 140 includes a first head 141 and the first column 142 connected to the first head 141, wherein the first head 141 may be a screw head and the first column 142 may be a stud. An outer diameter OD of the first head 141 is greater than a width W of the sliding groove 123, so as to prevent the first head 141 from passing through the sliding groove 123 from the first surface 121. On the other hand, the outer diameter of the first column 142 is smaller than the width W of the sliding groove 123, so the first column 142 may pass through the sliding groove 123 from the first surface 121 and the first column 142 further passes through the second surface 122 and is inserted into the positioning hole 131.

The positioning hole 131 may be a screw hole and has an inner thread in cooperation with the outer thread of the first column 142. The first column 142 is inserted into the positioning hole 131 and is screwed to the positioning hole 131 to prevent the knob 140 from being separated from the focus ring 130 and to prevent the knob 140 and the focus ring 130 from being separated from the positioning seat 120.

In the state shown in FIG. 2B, the first head 141 is not pressed against the first surface 121 of the positioning seat 120 (or the positioning diaphragm 150 on the first surface 121). Once the focal length or the sharpness of the projection image is adjusted, the user may apply a force to turn the first head 141, such that the depth of the first column 142 locked into the positioning hole 131 is increased and the first head 141 is allowed to move toward the first surface 121 of the positioning seat 120 until the first head 141 is pressed against the first surface 121 of the positioning seat 120 (or the positioning diaphragm 150 on the first surface 121), as shown in FIG. 2C.

The positioning diaphragm 150 is located between the first head 141 and the first surface 121 of the positioning seat 120. In the state shown in FIG. 2C, the first head 141 is in contact with the positioning diaphragm 150 and is pressed against the first surface 121 of the positioning seat 120 (or is pressed against the first surface 121 of the positioning seat 120 through the positioning diaphragm 150). Since the frictional resistance between the first head 141 and the positioning diaphragm 150 is large, the knob 140 in the locked state cannot be arbitrarily toggled.

Further, the positioning diaphragm 150 has a slot 151, wherein the slot 151 overlaps with the sliding groove 123, and the slot 151 and the sliding groove 123 have the same geometric contour. Therefore, the first column 142 first passes through the slot 151, then passes through the sliding groove 123, and is finally inserted into the positioning hole 131.

Other embodiments are listed as follows. The structural designs of the embodiments are substantially the same as or similar to the above embodiment. Therefore, the same or similar structural designs are not reiterated and descriptions are mainly proceeded for different structural designs.

Figure 3A:
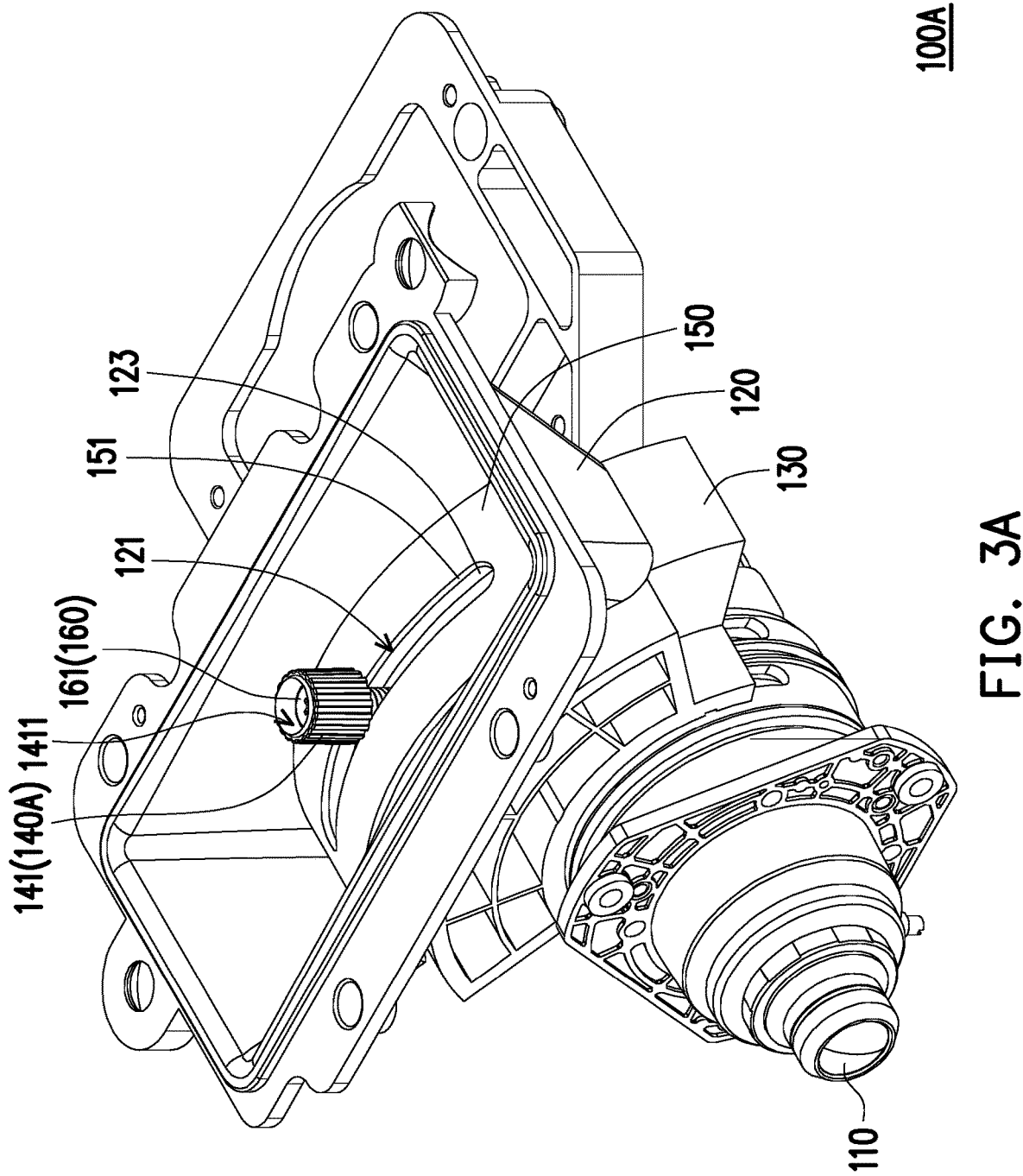
FIG. 3A is a schematic view of a specific structure of a focusing mechanism according to another embodiment of the disclosure.
Figure 3B:
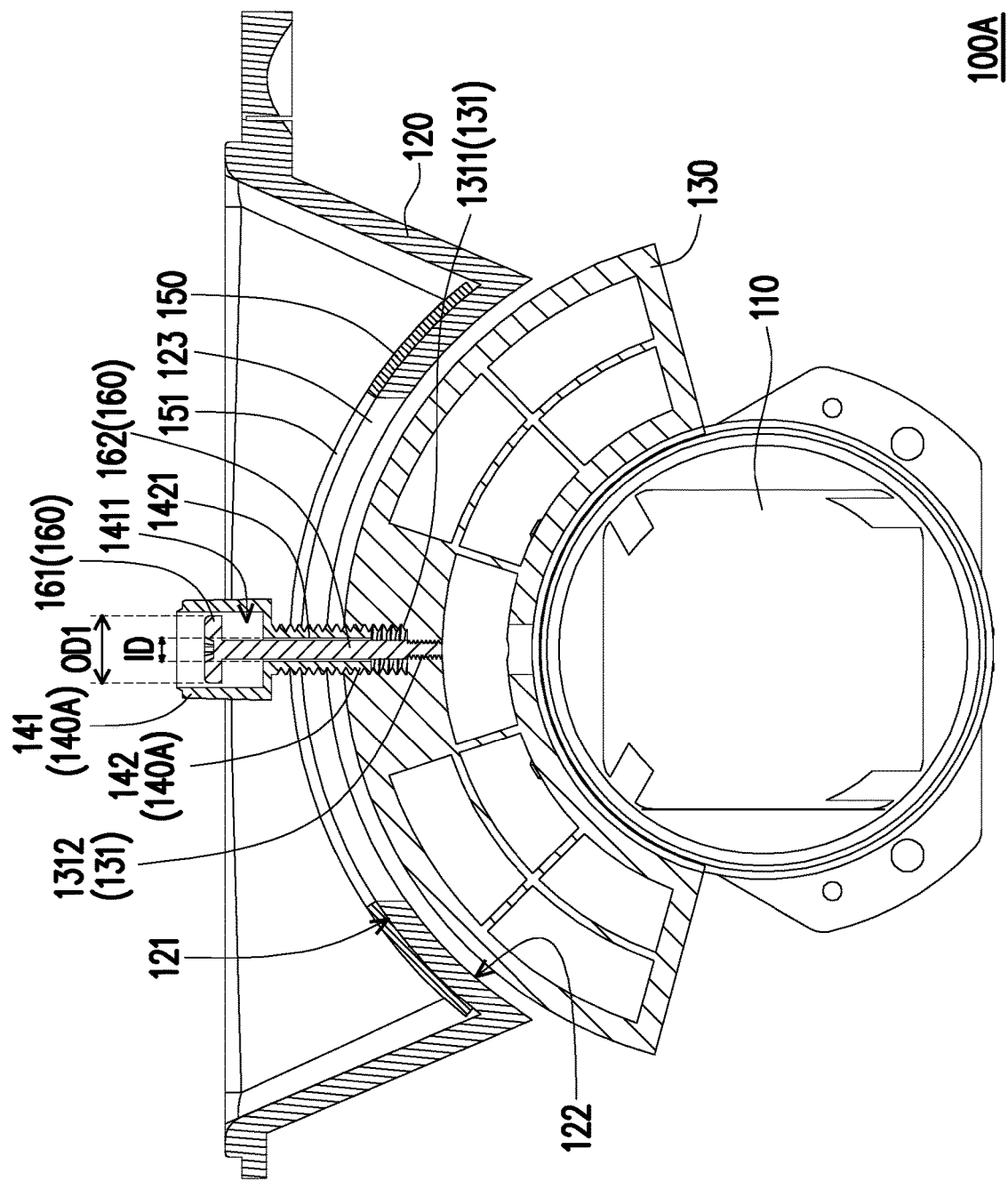
FIG. 3B is a cross-sectional view of the focusing mechanism of FIG. 3A before locking.
Figure 3C:
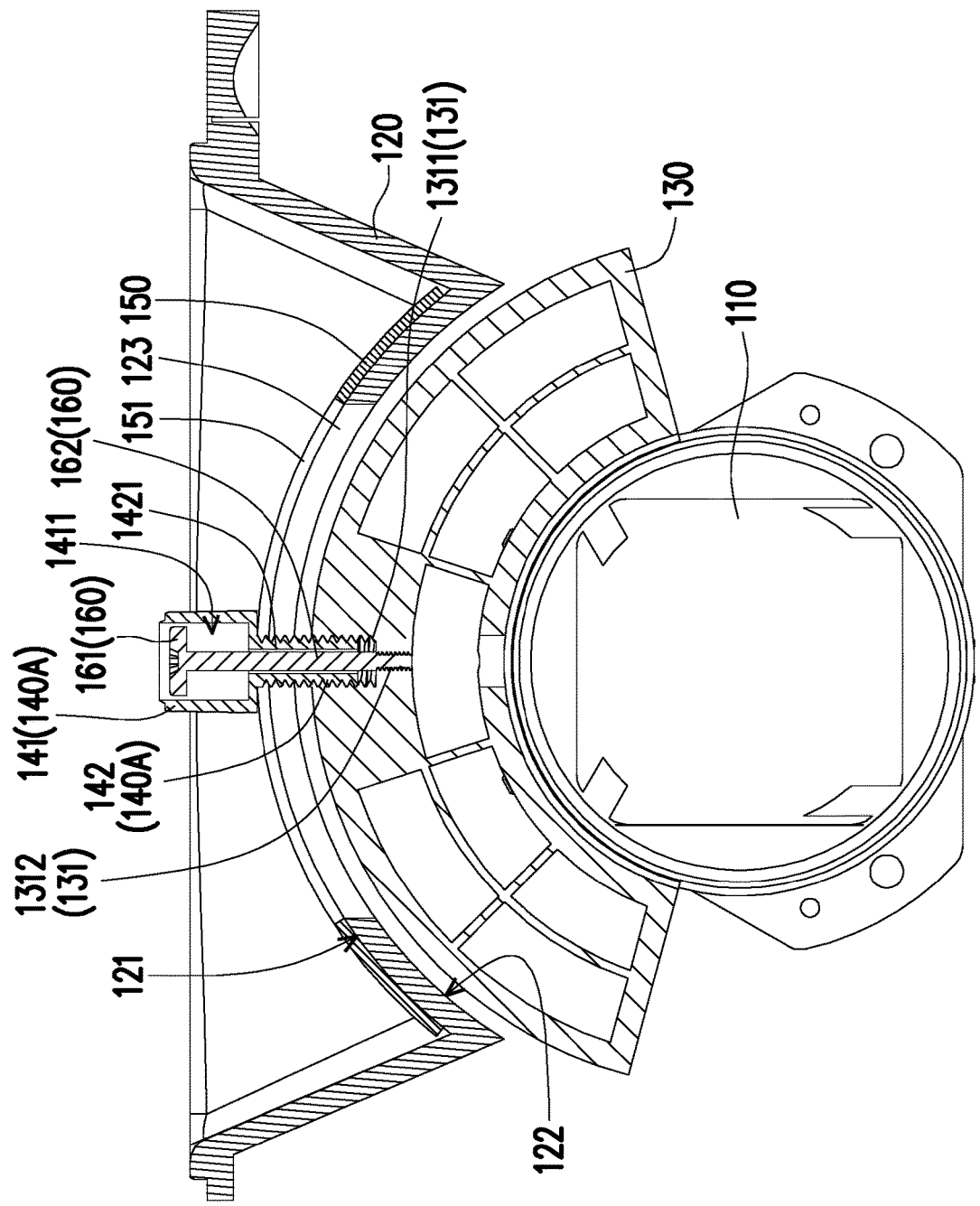
FIG. 3C is a cross-sectional view of the focusing mechanism of FIG. 3B after locking.

FIG. 3A is a schematic view of a specific structure of a focusing mechanism according to another embodiment of the disclosure. FIG. 3B is a cross-sectional view of the focusing mechanism of FIG. 3A before locking. FIG. 3C is a cross-sectional view of the focusing mechanism of FIG. 3B after locking. Please refer to FIG. 3A to FIG. 3C. Compared to the focusing mechanism 100 of the previous embodiment, in a focusing mechanism 100A of the present embodiment, the first head 141 of a knob 140A has a recess 1411 and the first column 142 has a perforation 1421 connected to the recess 1411.

On the other hand, the focusing mechanism 100A further includes a limiting member 160, wherein the limiting member 160 is inserted into the knob 140A and the limiting member 160 is configured to prevent the knob 140A from being separated from the focus ring 130. In detail, the limiting member 160 includes a second head 161 and a second column 162 connected to the second head 161, wherein the second head 161 is disposed in the recess 1411 but is not in contact with the sidewall of the recess 1411 and the second column 162 passes through the perforation 1421.

At least a portion of the first column 142 is inserted into the positioning hole 131 and is screwed to the positioning hole 131. On the other hand, the end of the second column 162 passes through the perforation 1421 of the first column 142, wherein the end of the second column 162 is inserted into and screwed to the positioning hole 131. For example, the positioning hole 131 has a first inner thread 1311 close to the second surface 122 of the positioning seat 120 and a second inner thread 1312 away from the second surface 122 of the positioning seat 120, wherein the first column 142 is screwed to the first inner thread 1311 and the second column 162 is screwed to the second inner thread 1312.

Therefore, when the second column 162 is screwed to the second inner thread 1312, the limiting member 160 is fixed. If the user applies a force to turn the first head 141, the depth of the first column 142 locked into the positioning hole 131 is decreased or increased and the knob 140A slides relative to the limiting member 160. Since an outer diameter OD1 of the second head 161 is greater than an inner diameter ID of the perforation 1421, during the process of the first head 141 moving away from the first surface 121 of the positioning seat 120, once the second head 161 is in contact with the bottom of the recess 1411, the first head 141 can no longer move in a direction away from the first surface 121 of the positioning seat 120, as shown in FIG. 3B. Accordingly, the limiting member 160 may prevent the knob 140A from being separated from the focus ring 130.

Figure 4B:
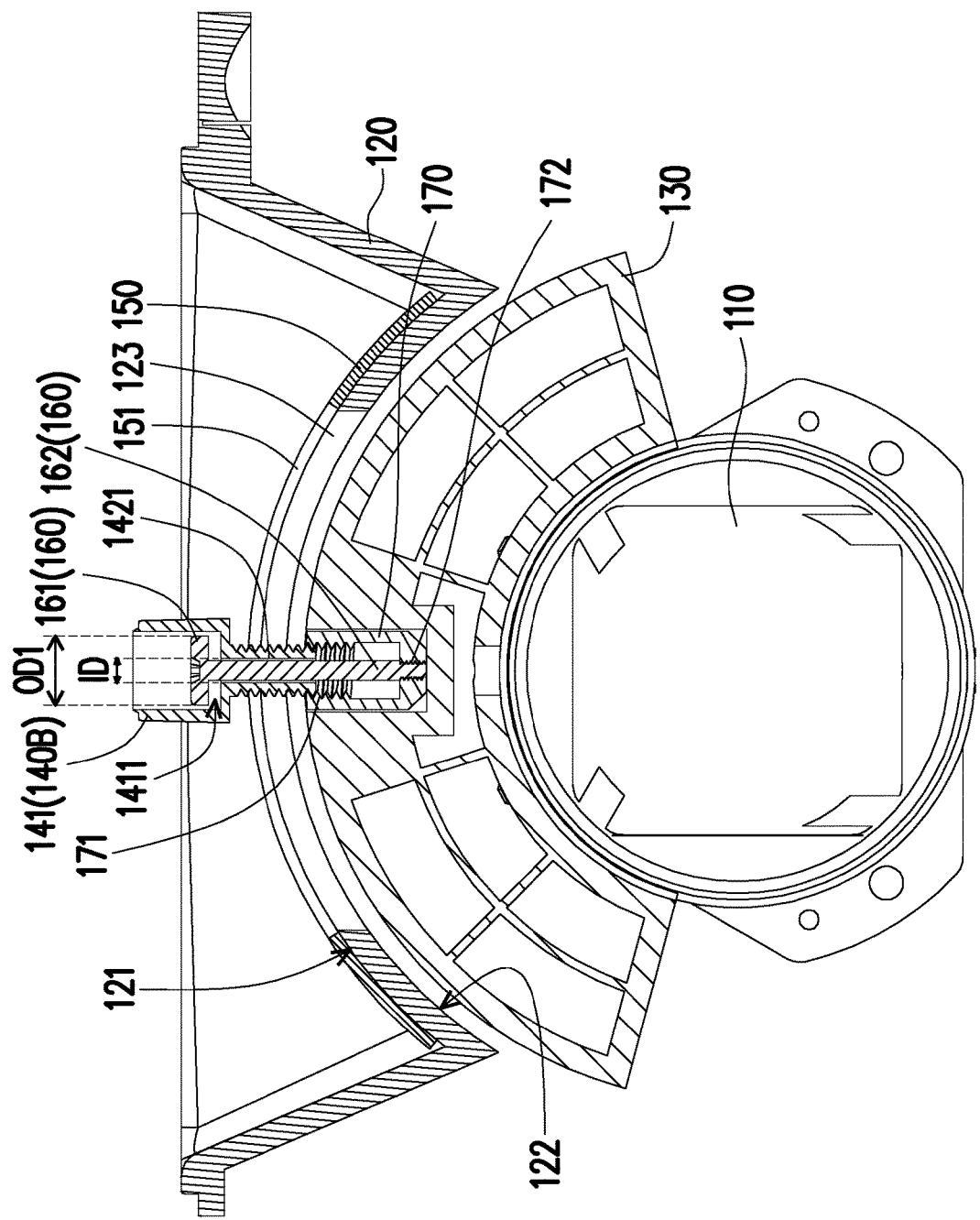
FIG. 4B is a cross-sectional view of the focusing mechanism of FIG. 4A before locking.
Figure 4C:
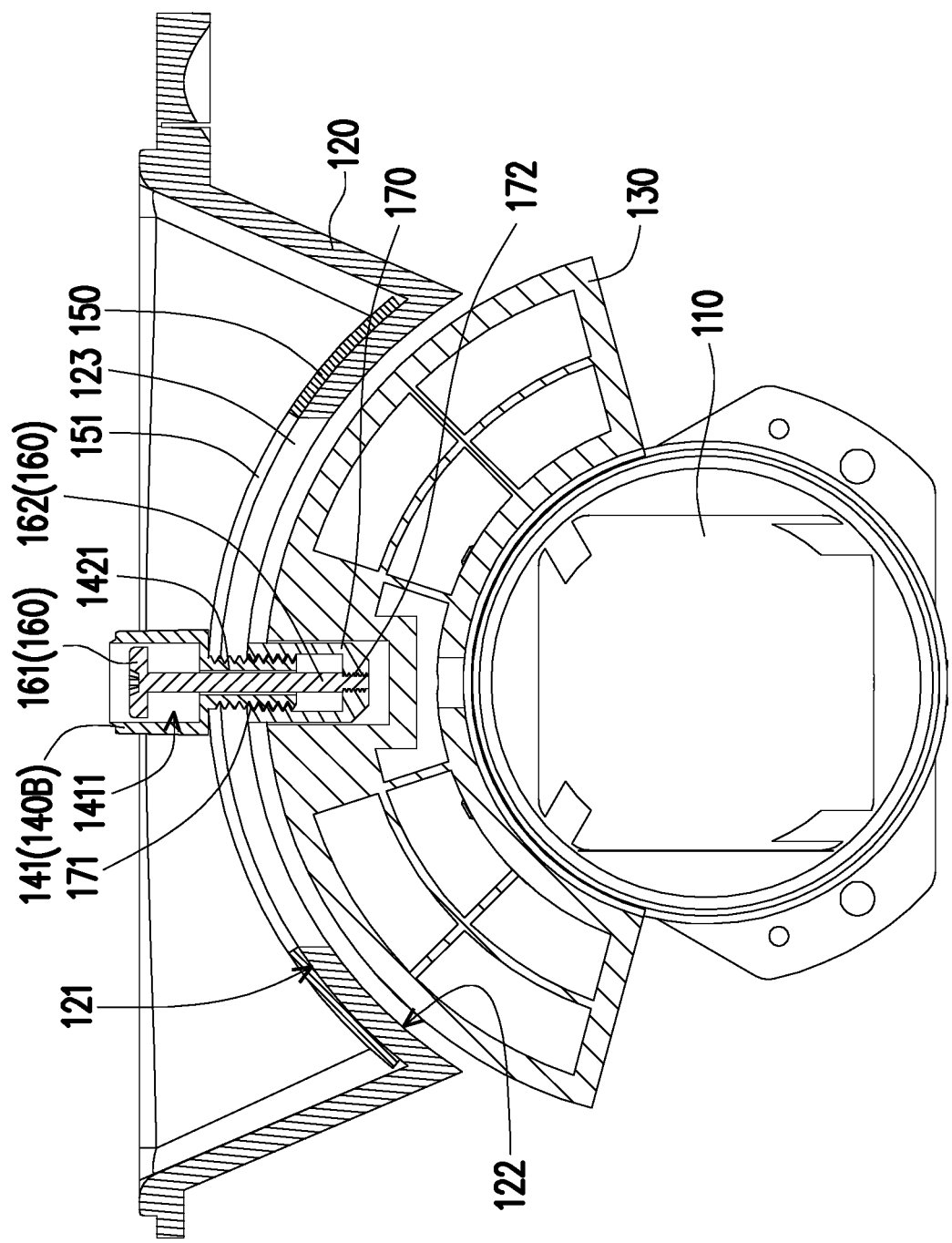
FIG. 4C is a cross-sectional view of the focusing mechanism of FIG. 4B after locking.

FIG. 4A is a schematic view of a specific structure of a focusing mechanism according to still another embodiment of the disclosure. FIG. 4B is a cross-sectional view of the focusing mechanism of FIG. 4A before locking. FIG. 4C is a cross-sectional view of the focusing mechanism of FIG. 4B after locking. Please refer to FIG. 4A to FIG. 4C. Compared to the focusing mechanism 100 of the previous embodiment, in a focusing mechanism 100B of the present embodiment, the first head 141 of a knob 140B has the recess 1411 and the first column 142 has the perforation 1421 connected to the recess 1411.

On the other hand, the focusing mechanism 100B further includes the limiting member 160, wherein the limiting member 160 is inserted into the knob 140B and the limiting member 160 is configured to prevent the knob 140B from being separated from the focus ring 130. In detail, the limiting member 160 includes the second head 161 and the second column 162 connected to the second head 161, wherein the second head 161 is disposed in the recess 1411, but the second head 161 is not in contact with the sidewall of the recess 1411, and the second column 162 passes through the perforation 1421.

In the embodiment, the focusing mechanism 100B further includes a positioning nut 170 slidably disposed in the positioning hole 131, wherein at least a portion of the first column 142 is inserted into the positioning nut 170 and is screwed to the positioning nut 170. On the other hand, the end of the second column 162 passes through the perforation 1421 of the first column 142, wherein the end of the second column 162 is inserted into and screwed to the positioning nut 170. For example, the positioning nut 170 has a first positioning inner thread 171 close to the second surface 122 of the positioning seat 120 and a second positioning inner thread 172 away from the second surface 122 of the positioning seat 120, wherein the first column 142 is screwed to the first positioning inner thread 171 and the second column 162 is screwed to the second positioning inner thread 172.

In the state shown in FIG. 4B, the first head 141 of the knob 140B is not pressed against the first surface 121 of the positioning seat 120 (or pressed against the first surface 121 of the positioning seat 120 through the positioning diaphragm 150) and the positioning nut 170 is not pressed against the second surface 122 of the positioning seat 120. At this time, the user may apply a force to the knob 140B, such that the knob 140B slides relative to the positioning seat 120. At the same time, the focus ring 130 and the lens 110 are driven by the knob 140 to slide and rotate relative to the positioning seat 120, so as to adjust the focal length or the sharpness of the projection image.

After adjusting the focal length or the sharpness of the projection image, the user may apply a force to turn the knob 140B, such that the depth of the first column 142 of the knob 140B locked into the positioning nut 170 is increased, thereby allowing the first head 141 to move toward the first surface 121 of the positioning seat 120 and allowing the first head 141 to be pressed against the first surface 121 of the positioning seat 120 (or pressed against the first surface 121 of the positioning seat 120 through the positioning diaphragm 150). At the same time, the positioning nut 170 is driven by the knob 140B to slide toward the second surface 122 of the positioning seat 120 and is pressed against the second surface 122 of the positioning seat 120, as shown in FIG. 4C.

In the state shown in FIG. 4C, based on the frictional resistance between the first head 141 and the positioning diaphragm 150, the frictional resistance between the positioning nut 170 and the second surface 122 of the positioning seat 120, and the clamping force generated by the first head 141 and the positioning nut 170 on the positioning seat 120, the knob 140B cannot be arbitrarily toggled, so as to lock the focus ring 130 to the positioning seat 120 through the knob 140B and the positioning nut 170 to prevent the focus ring 130 and the lens 110 from being shaken by an external force, thereby preventing an out-of-focus situation from happening.

In particular, the second column 162 of the limiting member 160 is screwed to the positioning nut 170, so the limiting member 160 may move synchronously with the positioning nut 170.

On the other hand, since the outer diameter OD1 of the second head 161 is greater than the inner diameter ID of the perforation 1421, during the process of the first head 141 moving away from the first surface 121 of the positioning seat 120, once the second head 161 is in contact with the bottom of the recess 1411, the first head 141 can no longer move in a direction away from the first surface 121 of the positioning seat 120, as shown in FIG. 4B.

In summary, the embodiments of the disclosure have at least one of the following advantages or effects. In the focusing mechanism and the projection device of the disclosure, the user may drive the focus ring and the lens fixed to the focus ring to slide and rotate relative to the positioning seat through the knob, so as to adjust the focal length or the sharpness of the projection image. After adjusting the focal length or the sharpness of the projection image, the user may lock the focus ring to the positioning seat through the knob to prevent the focus ring and the lens fixed to the focus ring from being shaken by an external force, thereby preventing an out-of-focus situation from happening. On the other hand, the knob is configured to be pressed against the first surface of the positioning seat and the first surface is covered by the positioning diaphragm. Therefore, the knob is in contact with the positioning diaphragm and is pressed against the first surface of the positioning seat through the positioning diaphragm. Since the frictional resistance between the knob and the positioning diaphragm is large, the knob in the locked state cannot be arbitrarily toggled.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the disclosure" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be configured to interpret or limit the scope or meaning of the claims. Any advantages and benefits described may not apply to all embodiments of the invention. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A focusing mechanism, comprising a positioning seat, a focus ring, a lens, and a knob, wherein:
   the lens has an optical axis;
   the positioning seat has a first surface, a second surface opposite to the first surface, and a sliding groove penetrating the first surface and the second surface;
   the focus ring is slidably and rotatably disposed on the second surface of the positioning seat, the lens is fixed to the focus ring, and the focus ring has a positioning hole, wherein the focus ring is located between the positioning seat and the lens, and the positioning hole is aligned to the sliding groove in a direction perpendicular to the optical axis; and
   the knob passes through the sliding groove and is inserted into the positioning hole and the knob is pressed against the first surface of the positioning seat.

2. The focusing mechanism according to claim 1, wherein the knob comprises a first head and a first column connected to the first head, the first head is pressed against the first surface of the positioning seat, the first column passes through the sliding groove, and the first column is inserted into the positioning hole and is screwed to the positioning hole.

3. The focusing mechanism according to claim 2, wherein the first head has a recess, the first column has a perforation connected to the recess, and the focusing mechanism further comprises a limiting member inserted into the knob, wherein the limiting member comprises a second head and a second column connected to the second head, the second head is disposed in the recess, the second column passes through the perforation, the second column is inserted into and screwed to the positioning hole, and an outer diameter of the second head is greater than an inner diameter of the perforation.

4. The focusing mechanism according to claim 2, wherein an outer diameter of the first head is greater than a width of the sliding groove.

5. The focusing mechanism according to claim 1, further comprising:
   a positioning diaphragm, covering the first surface of the positioning seat, wherein the sliding groove is exposed outside the positioning diaphragm and the knob is pressed against the positioning diaphragm.

6. The focusing mechanism according to claim 5, wherein the positioning diaphragm has a slot, wherein the slot overlaps with the sliding groove, and the slot and the sliding groove have a same geometric contour.

7. The focusing mechanism according to claim 1, further comprising:
   a positioning nut, slidably disposed in the positioning hole, wherein the knob comprises a first head and a first column connected to the first head, the first head is pressed against the first surface of the positioning seat, the first column passes through the sliding groove, the first column is inserted into and screwed to the positioning nut, and the positioning nut is pressed against the second surface of the positioning seat.

8. The focusing mechanism according to claim 7, wherein the first head has a recess, the first column has a perforation connected to the recess, and the focusing mechanism further comprises a limiting member inserted into the knob, wherein the limiting member comprises a second head and a second column connected to the second head, the second head is disposed in the recess, the second column passes through the perforation, the second column is inserted into and screwed to the positioning nut, and an outer diameter of the second head is greater than an inner diameter of the perforation.

9. The focusing mechanism according to claim 7, wherein an outer diameter of the first head is greater than a width of the sliding groove.

10. A projection device, comprising a light source, a light valve, and a projection lens, wherein:
    the light source is configured to provide an illumination beam;
    the light valve is disposed on a transmission path of the illumination beam and is configured to convert the illumination beam into an image beam; and
    the projection lens is disposed on a transmission path of the image beam and the projection lens comprises an optical module and a focusing mechanism, the focusing mechanism is disposed on one side of the optical module, the optical module is located between the light valve and the focusing mechanism, and the focusing mechanism comprises a positioning seat, a focus ring, a lens, and a knob, wherein:
       the lens has an optical axis, wherein the lens is located on the transmission path of the image beam and is configured to project the image beam;
       the positioning seat has a first surface, a second surface opposite to the first surface, and a sliding groove penetrating the first surface and the second surface;
       the focus ring is slidably and rotatably disposed on the second surface of the positioning seat, the lens is fixed to the focus ring, and the focus ring has a positioning hole, wherein the focus ring is located between the positioning seat and the lens, and the positioning hole is aligned to the sliding groove in a direction perpendicular to the optical axis; and the knob passes through the sliding groove and is inserted into the positioning hole and the knob is pressed against the first surface of the positioning seat.

11. The projection device according to claim 10, wherein the knob comprises a first head and a first column connected to the first head, the first head is pressed against the first surface of the positioning seat, the first column passes through the sliding groove, and the first column is inserted into the positioning hole and is screwed to the positioning hole.

12. The projection device according to claim 11, wherein the first head has a recess, the first column has a perforation connected to the recess, and the focusing mechanism further comprises a limiting member inserted into the knob, wherein the limiting member comprises a second head and a second column connected to the second head, the second head is disposed in the recess, the second column passes through the perforation, the second column is inserted into and screwed to the positioning hole, and an outer diameter of the second head is greater than an inner diameter of the perforation.

13. The projection device according to claim 11, wherein an outer diameter of the first head is greater than a width of the sliding groove.

14. The projection device according to claim 10, wherein the focusing mechanism further comprises a positioning diaphragm covering the first surface of the positioning seat, wherein the sliding groove is exposed outside the positioning diaphragm and the knob is pressed against the positioning diaphragm.

15. The projection device according to claim 14, wherein the positioning diaphragm has a slot, wherein the slot overlaps with the sliding groove, and the slot and the sliding groove have a same geometric contour.

16. The projection device according to claim 10, wherein the focusing mechanism further comprises a positioning nut slidably disposed in the positioning hole, wherein the knob comprises a first head and a first column connected to the first head, the first head is pressed against the first surface of the positioning seat, the first column passes through the sliding groove, the first column is inserted into and screwed to the positioning nut, and the positioning nut is pressed against the second surface of the positioning seat.

17. The projection device according to claim 16, wherein the first head has a recess, the first column has a perforation connected to the recess, and the focusing mechanism further comprises a limiting member inserted into the knob, wherein the limiting member comprises a second head and a second column connected to the second head, the second head is disposed in the recess, the second column passes through the perforation, the second column is inserted into and screwed to the positioning nut, and an outer diameter of the second head is greater than an inner diameter of the perforation.

18. The projection device according to claim 16, wherein an outer diameter of the first head is greater than a width of the sliding groove.

* * * * *